Oct. 5, 1954
I. B. LASKOWITZ
2,690,886
CONTROL FOR JET-POWERED CONVERTIBLE AIRCRAFT
Filed July 8, 1952
4 Sheets-Sheet 1
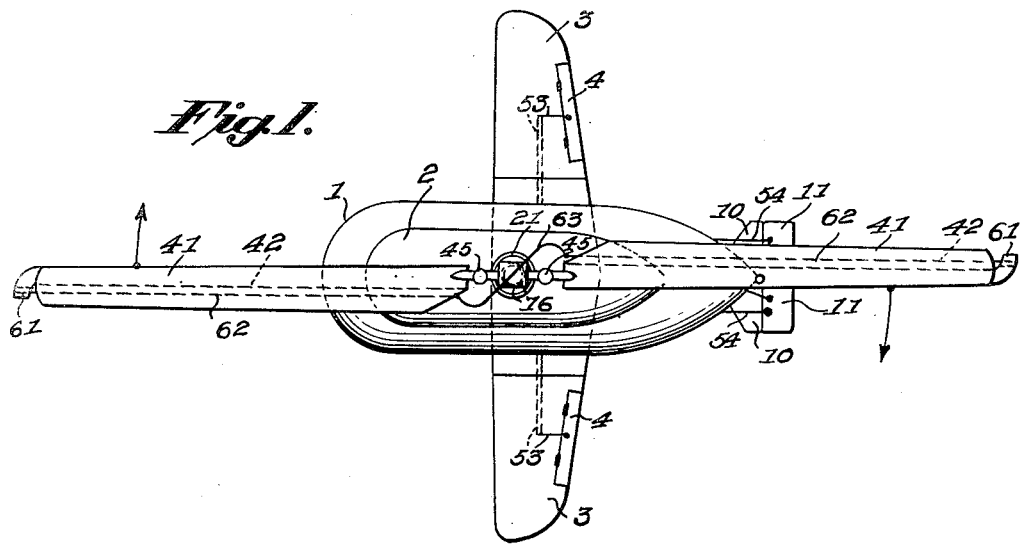
INVENTOR.
I. B. Laskowitz
BY Robert Dennison
ATTORNEY.

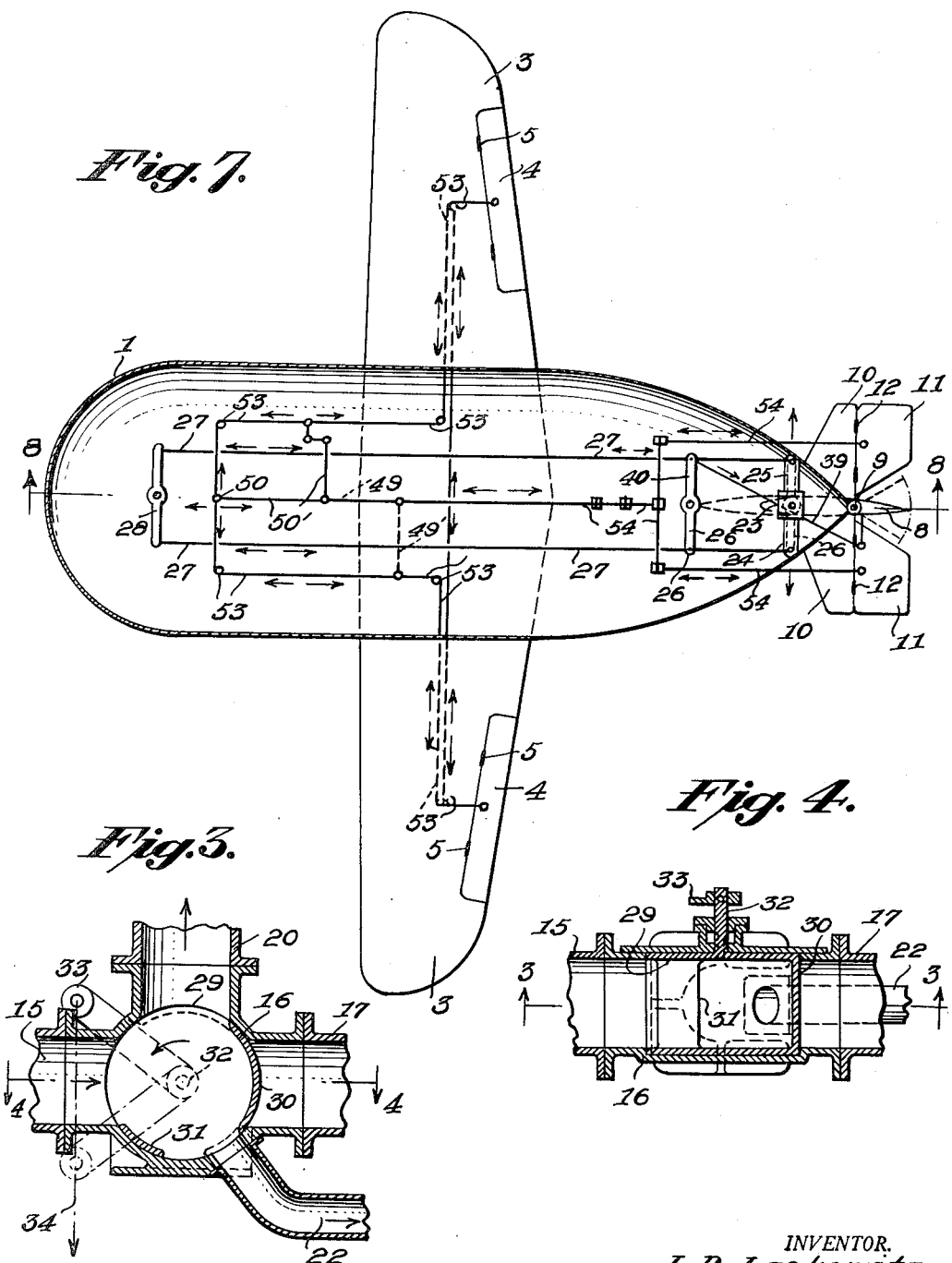

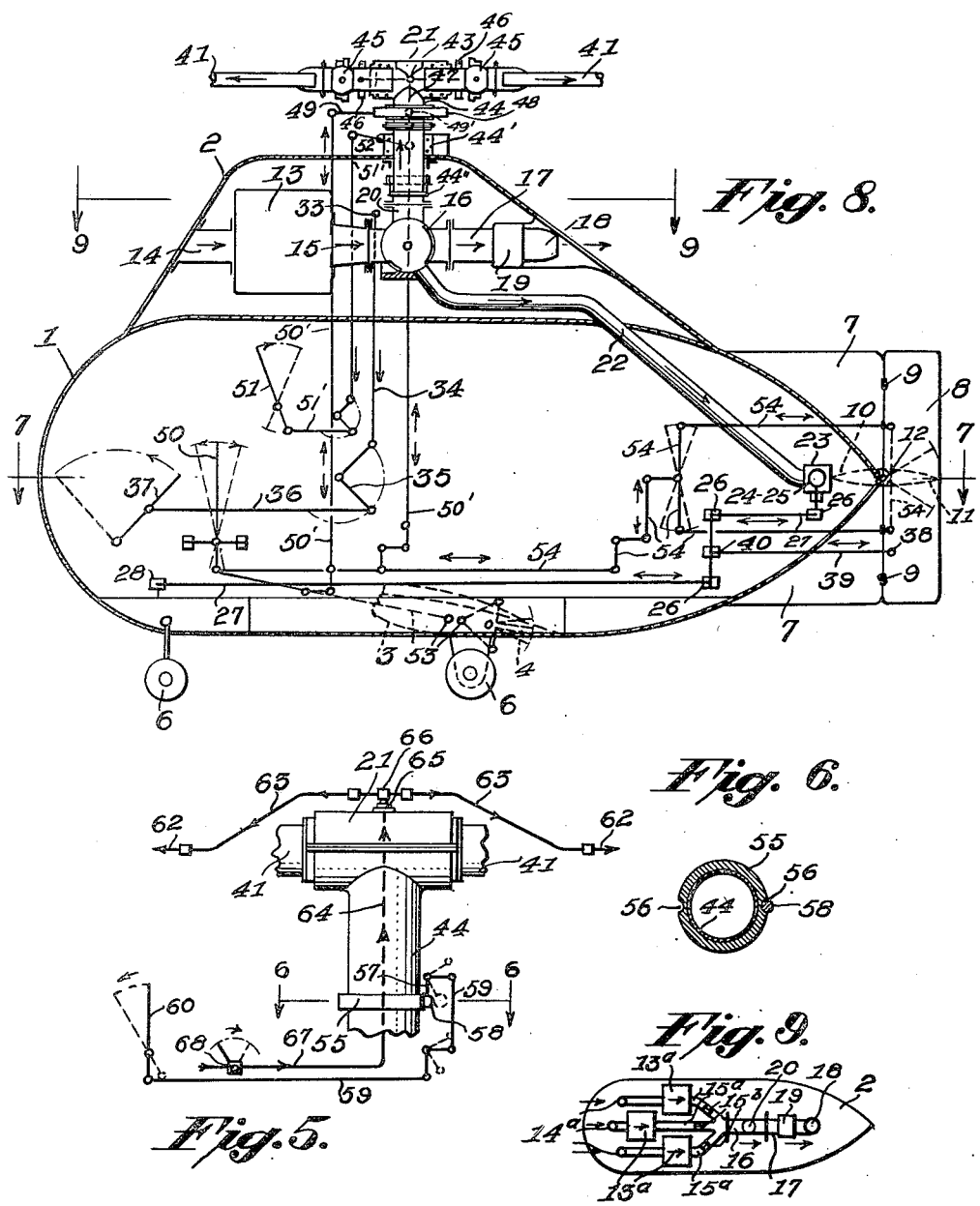

Oct. 5, 1954     I. B. LASKOWITZ     2,690,886
CONTROL FOR JET-POWERED CONVERTIBLE AIRCRAFT
Filed July 8, 1952     4 Sheets-Sheet 4

INVENTOR
I. B. Laskowitz
BY
ATTORNEY

Patented Oct. 5, 1954

2,690,886

UNITED STATES PATENT OFFICE 2,690,886

CONTROL FOR JET-POWERED CONVERTIBLE AIRCRAFT

Isidor B. Laskowitz, Brooklyn, N. Y.

Application July 8, 1952, Serial No. 297,710

20 Claims. (Cl. 244—7)

This invention relates to controls for jet-powered convertible aircraft, and embodies certain improvements in jet-powered convertible aircraft as covered by my copending application bearing Serial No. 211,903, filed February 20, 1951.

Some of the principal problems facing designers today is the provision of adequate stability and control for convertible aircraft, for all conditions of flight, when operating as a helicopter and as an airplane.

It is a primary object of this invention, to provide in a simple manner, adequate stability and control, about all three axes, for jet-powered convertible aircraft, for all conditions of flight, when the aircraft is operating as a helicopter and when converted to operate as an airplane.

Another object of the invention is to provide an aircraft with: a rotor having cyclic and collective pitch control of the rotor blades; fixed-wings having aileron control; horizontal stabilizer surfaces with elevator control; vertical stabilizer surfaces with rudder-steering control; a pressure jet source that may be applied vertically for driving the rotor, may be applied horizontally for producing a direct forward thrust, and may be applied for jet-steering control.

A further object of the invention is to provide a jet-powered convertible aircraft in which the cyclic pitch control of the rotor blades, the aileron control of the fixed wings and the elevator control are interconnected and operated from one control stick or lever.

Another object of the invention is to provide a jet-powered convertible aircraft in which the rudder-steering control and the jet-steering control are interconnected and operated by the same steering foot bar or pedals.

Another object of the invention is to provide a jet-powered convertible aircraft in which the rotor may be locked when desired, with the blades in a fore and aft position, when the aircraft is operating as an airplane to reduce the drag of the rotor.

Another object of the invention is to provide a jet-powered convertible aircraft powered by a number of jet engines so that in the event of failure of one or more of the engines the aircraft will be able to carry its full load but at reduced speed.

Another object of the invention is to provide a jet-powered convertible aircraft in which afterburner grids are installed in the exhaust tubes at the tips of the rotor blades over which fuel may be spread, when desired, to increase the jet force acting at the tip of the blades for producing a greater rotor thrust and hence greater lifting power.

Other objects and advantages of the present invention will become apparent from the following detailed description of a preferred embodiment of the invention illustrated in the accompanying drawing wherein like reference characters designate corresponding parts throughout the several views and wherein:

Figure 1 is a top plan view of a jet-powered convertible aircraft embodying my invention.

Figure 2 is a side view of the improved aircraft.

Figure 3 is an enlarged vertical sectional view of the rotary pressure jet control valve, taken along the line 3—3 of Figure 4.

Figure 4 is a transverse sectional view of the rotary control valve, taken along the line 4—4 of Figure 3.

Figure 5 is an enlarged side view of the rotor head showing the rotor locking mechanism.

Figure 6 is a transverse sectional view, taken along the line 6—6 of Figure 5.

Figure 7 is an enlarged horizontal sectional view of the jet-powered convertible aircraft taken through the cabin of the fuselage along the line 7—7 of Figure 8.

Figure 8 is an enlarged vertical sectional view of the aircraft taken along the line 8—8 of Figure 7.

Figure 9 is a horizontal sectional plan view taken through the engine compartment along the line 9—9 of Figure 8, but showing three engines instead of one.

Figure 10:
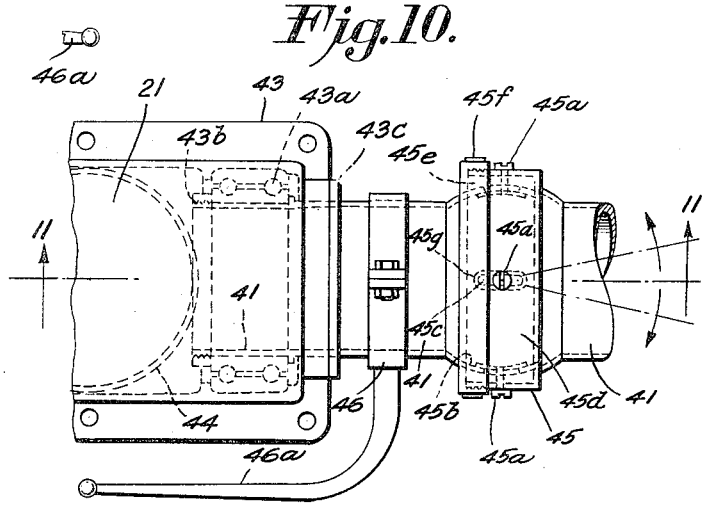
Figure 10 is an enlarged fragmentary plan view of the inner end mounting of the rotor blades.

The improved aircraft has a fuselage 1 and carries an engine compartment 2 which extends longitudinally of the fuselage. Fixed wings 3 extend from opposite sides of the fuselage and are provided with ailerons 4 hinged at 5. There has also been provided landing gear 6 which is preferably retractable. Vertical stabilizer surfaces 7 are provided as is a rudder 8 hinged at 9. Horizontal stabilizer surfaces 10 are furnished as well as elevator flaps 11 hinged at 12.

Within the compartment 2 is an engine 13 of the turbojet type having an inlet 14 opening through the front end of the compartment, and from this engine extends an exhaust tube 15 which connects to a rotary pressure jet control valve 16. A branch exhaust tube 17 extends towards the rear end of the chamber where it terminates in a discharge nozzle 18 from which the discharging jet produces a direct forward thrust. Near the nozzle is an afterburner 19 for increasing the direct forward thrust of the jet.

A branch exhaust tube 20 extends upwardly from the rotary control valve 16 and rising from the top of the engine chamber furnishes propelling fluid to a rotor 21. Still another branch exhaust tube 22 extends from the rotary control valve 16 towards the rear end of the chamber and then downwardly into the fuselage towards the rear end thereof where it terminates in a three-way jet-steering control valve 23. Exhaust tubes 24 and 25 for discharging steering jets from the control valve 23 extend from opposite sides thereof. The jet-steering control valve 23 is actuated by levers 26 to which are attached cables 27 connecting at the front end of the fuselage with the opposite ends of a steering foot bar 28. Conventional foot pedals may be used instead of a foot bar. By pushing upon this foot bar with his feet the pilot may adjust the control valve 23 and shut off flow of fluid through both steering tubes or allow flow of a steering jet through a predetermined steering tube 24 or 25 according to which direction a turn is to be made.

Referring to Figures 3 and 4, the rotary control valve 16 has on the inside thereof the rotary valve element 29 provided with disc portions 30 and 31. A spindle 32 forming a part of the valve element 29 extends through the casing of the control valve 16 and has secured thereto the link 33. As shown in the drawing, propelling fluid exhausting from the engine will be directed to the rotor 21 and the jet-steering control valve 23 since exhaust branches 20 and 22 are uncovered by disc portions 30 and 31. Control valve 16 is actuated by a rod 34 pivoted at the upper end to the link 33 and at the lower end to the bellcrank lever 35 to which is attached the rear end of a rod 36 which has its front end connected with a lever 37 within reach of the operator of the aircraft. By movement of the lever 37 in a forward direction exhaust branches 20 and 22 will be covered by the disc portions 30 and 31 while exhaust branch 17 will be uncovered, thus directing the exhaust jet from the engine rearward to produce a direct thrust.

Rudder 8 has secured thereto a bracket 38 which is connected by links 39 and 40 to the levers 26 for transverse movement by the steering foot bar 28. Thus, movement of the foot bar 28 will not only actuate the rudder 8 but also the jet-steering control valve 23. The linkages are so arranged that the jet-steering and rudder-steering forces act in the same sense or direction to supplement one another under certain flight conditions. In hovering and vertical flight conditions the jet-steering forces are effective and the rudder, since it is hinged vertically, not effective for directional control. In forward flight, however, the rudder is most effective and with rotary control valve 16 turned to produce a direct forward thrust, the steering jets are not effective, since the exhaust from the engine to the steering jets has been cut off by disc portion 31 of the rotary valve element 29. This arrangement prevents the use of jet power for steering not needed in forward flight.

In order that the aircraft may be operated as a helicopter there have been provided airfoils or blades 41 which are of hollow metal formation. Tubes 42, which are elliptical in cross section, extend longitudinally through the hollow blades for their full length. Outer end portions of the tubes 42 project from the ends of the blades and are curved terminating in exhaust nozzles from which jets are emitted, imparting turning movement to the rotor 21 in the opposite direction of the issuing jets. The blades 41 are rotatably mounted through opposite ends of a detachable rotor head 43 in combined radial and thrust bearings 43$^a$, and are held against outward displacement by nuts 43$^b$. Packing glands and packing 43$^c$ are provided to prevent escape of fluid. A vane 43$^d$ is secured to rotor head 43 for easing the flow of fluid. A tubular neck 44 extends downwardly from the rotor head into the engine compartment, where it is rotatably mounted in a bearing 44′. This neck has its lower end in telescoping engagement, through suitable stuffing box 44″, with the vertical branch exhaust tube 20. With rotary control valve 16 set as shown in Figure 3 fluid will enter the rotor head through its neck and pass out through the tubes 42. Hollow spherical joints 45 with pins 45$^a$ are provided at the inner ends of the rotor blades and permit movement of the blades, within defined limits, in a vertical plane (flapping) and movement in a horizontal plane (dragging) as indicated by the dot and dash lines shown in Figures 10 and 11.

Figure 11:
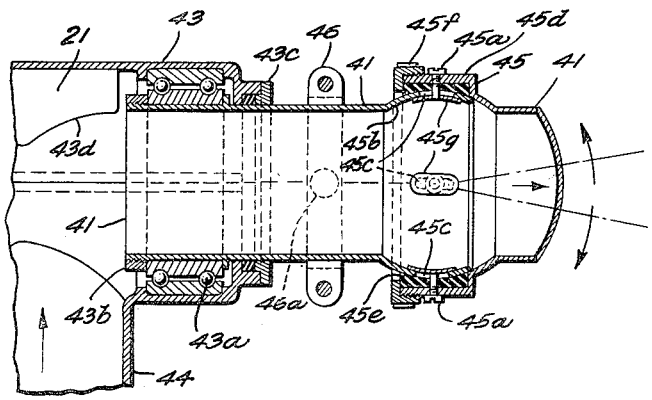
Figure 11 is a vertical sectional view of the blade mounting as observed in the plane of line 11—11 on Fig. 10.

Referring to Figures 10 and 11, inner end spherical portions 45$^b$ of the joints are provided with slots 45$^c$ which engage the pins 45$^a$ held in the socket 45$^d$ formed about the spherical portions 45$^b$. Packing 45$^e$ is fitted in the socket 45$^d$ to form a tight joint. A nut 45$^f$ screwed on the socket 45$^d$ is provided to hold the packing 45$^e$ in place and compress it. Cover plates 45$^g$ are welded on the inside of spherical portions 45$^b$ over the slots 45$^c$ to further prevent leakage and to reinforce the slotted portions.

The rotor blades 41 are turned about their longitudinal axes to obtain pitch adjustment by imparting vertical movement to L-shaped arms 46$^a$ provided with clamps 46 secured to the blades, through the links 47 connected at the lower ends to a conventional swashplate 48 comprising a universally mounted ball bearing. The outer race of the swashplate has secured thereto an arm 49 and another arm 49′ at right angles to arm 49 which are connected with a cyclic or differential pitch control lever or stick 50 by linkage 50′ and as the lever or stick is mounted for universal tilting movement it may be moved forward, backward, to the right, or to the left and the blades turned for selective pitch adjustment. The swashplate 48 may be raised or lowered to effect a simultaneous or collective change of blade pitch by means of a collective pitch lever or stick 51 which is connected by linkage 51′ to a forked lever 52 pivotally mounted and connected to the inner ring of the swashplate. The rotor, swashplate and their controls are more fully and specifically described in copending application bearing Serial No. 211,903, filed February 20, 1951, for jet-powered convertible aircraft.

The ailerons 4 of the fixed wings 3 are connected by means of cables and sheaves 53 to the sides of the cyclic pitch control stick 50, so that movement of the stick 50 to the right will raise one aileron and lower the other, while moving the stick to the left will reverse the movement of the ailerons.

The elevator flaps 11 of the horizontal stabilizer surfaces 10 are connected by means of the linkage 54 to the rear of the cyclic pitch control stick 50 so that movement of the stick 50 forward will lower the elevator flaps, while movement of the stick backward will raise the elevator flaps.

The connections between the cyclic pitch control stick 50, the swashplate 48, the ailerons 4, and the elevator flaps 11 are such that movement of the control stick in any direction varies the rotor forces, aileron forces and elevator forces in the same sense or direction; that is, the various forces produced supplement one another and hence will give rise to better stability and control of the aircraft.

Referring to Figures 5 and 6, a standard brake mechanism of any suitable type (not shown) is associated with the tubular neck 44 of the rotor 21 to prevent or retard its rotation when desired. To permit locking of the rotor when desired, with the blades in a fore and aft direction, when the aircraft is operating as an airplane to reduce the drag of the rotor, a ring member 55 is provided and secured to the tubular neck 44. Ring member 55 has diametrically opposed slots 56 cut therein which are in longitudinal alignment with rotor blades 41. Located aft on the center line of the aircraft is the bellcrank 57 having secured thereto the ball 58 in swinging engagement with slots 56 of the ring member 55. The bellcrank 57 is connected by means of the linkage 59 to the rotor locking lever 60 located near the operator. The ball 58 is normally out of engagement with slots 56 and the rotor is free to rotate.

With the aircraft in forward flight operating as an airplane, and the rotor carrying no load, should the operator desire to lock the rotor blades in a fore and aft direction, he first applies the standard brake mechanism to retard the rotation of the rotor. With the rotor turning very slowly, as may be indicated by a revolution counter, the operator then moves locking lever 60 from the dotted position shown in Figure 5 rearward, thereby engaging ball 58 in either one of the slots 56 of ring member 55 and causing the rotor to be locked with the blades in a fore and aft direction for minimum drag in forward flight.

Referring to Figures 1 and 5, the exhaust tubes 42 of the rotor blades 41 are provided with afterburner grids 61, at the tips of the blades, preceding the exhaust nozzles. Fuel supply lines 62 extend from the afterburner grids 61, on the inside of the blades 41 towards the rotor head 43, where they are connected by means of flexible fuel line connections 63 to a vertical fuel supply line 64 on the inside of the tubular neck 44. The flexible fuel line connections 63 permit flapping and dragging movement of the rotor blades. The vertical fuel supply line 64 does not rotate with the rotor and passes through a stuffing box 65 on the top of the rotor head 43. A rotatable stuffing box connection 66 joins fuel supply lines 63 and 64, permitting rotation of the flexible fuel lines 63 with the rotor blades 41. The bottom of vertical fuel supply line 64 is connected to the pump fuel supply discharge line 67. A blade tip fuel control valve 68 located near the operator is provided in fuel supply discharge line 67.

Should the operator desire to increase the jet force acting at the tip of the blades in order to produce a greater rotor thrust, he has but to open blade tip fuel control valve 68. In so doing fuel will be delivered through the fuel supply lines 64, 63 and 62 and spread over the afterburner grids 61. The effect of this is to increase the temperature of the exhaust gases and thereby the corresponding volume, velocity, and force of the jet discharged at the tip of the blades.

Referring to Figure 9 an arrangement is shown of the power plant and ducting for large transport-type of aircraft and wherein three turbojet engines 13a having inlet tubes 14a are mounted in the forward portion of the engine compartment 2, and have exhaust tubes 15a connected to the inlet end of the rotary pressure jet control valve 16. Valves 15b of the butterfly type or other suitable type, remotely operated by the pilot, are provided in the exhaust tubes 15a or may be installed in the inlet tubes 14a for shutting off the tubes of a particular jet engine when it becomes inoperative to reduce the drag and prevent backflow from the operating engines. The discharge nozzle 18 at the end of branch exhaust tube 17 is now preferably of the adjustable area type.

This simple arrangement shown of multiple engines provides the safety and flexibility required of large transport-type of aircraft at a minimum of frontal area and hence drag.

*Operation*

To use the improved aircraft as a helicopter, the engine is started and air is drawn in through the inlet 14, while the exhausting fluid, forming the propelling medium, is discharged through the rotor head and the tubes 42 to the outer ends of the blades where it is discharged through the nozzles and causes the rotor 21 to revolve. The speed of the rotor may be controlled, by the operator of the aircraft, by adjusting the throttle of the engine and the pitch angle of the blades.

In hovering and vertical flight conditions the rotor carries the full weight of the aircraft and stability and control, about all three axes, is obtained by manipulation of the cyclic pitch stick 50, collective pitch stick 51, and the steering foot bar 28. Under these conditions the ailerons 4, elevator flaps 11 and rudder 8 are ineffective since the downwash of the rotor is vertical. Lateral and longitudinal stability is obtained by variation in the rotor thrust and directional control secured by the force of the steering jets. In forward flight, with the aircraft still operating as a helicopter, the weight is divided between the rotor and the fixed wings; the extent of this division depending on the speed of forward flight and inclination of the rotor axis. Stability and control is obtained as before by manipulation of the cyclic pitch stick, collective pitch stick and the steering foot bar. Under these conditions the ailerons, elevator flaps, and rudder are effective since the airstream is horizontal. Lateral and longitudinal stability is obtained now by variation in the rotor thrust supplemented by the aileron and elevator forces. Directional control is accomplished by the force of the steering jets supplemented by the rudder forces.

To convert the improved aircraft while in forward flight, from helicopter operation to operation as an airplane, it is necessary to slowly move lever 37 forwardly and adjust the inclination of the rotor axis by means of the cyclic pitch stick 50. Discharge of the jet will now be to the rear and a direct forward propelling force will be produced. The direct forward thrust could be increased considerably by the use of the afterburner 19. As forward flight speed increases the weight of the aircraft will be taken up more and more by the fixed wings 3 until a point is reached when the rotor carries no load and the entire weight is carried by the fixed wings as in an airplane. The collective pitch of the rotor blades would be reduced and the rotor would produce no thrust. Stability and control while flying as an airplane is again obtained as before by manipulation of the cyclic pitch stick, collective pitch stick, and the steering foot bar. Lateral and longitudinal stability is obtained now by variation of the ailerons and elevator forces. Directional control is accomplished by the rudder forces alone, since exhaust to the steering-jets have been cut off when lever 37 was moved forward.

From the preceding description of the improved jet-powered convertible aircraft it will be seen that adequate stability and controls have been provided, for all conditions of flight, when operating both as a helicopter, as an airplane and intermediate to these two types of aircraft. Vertical and inclined autorotational descent of the aircraft, in an emergency, should the engine fail, could also be made safely.

Obviously, minor changes may be made in the preferred embodiments of my invention without departing from the essence of the invention, and it is therefore understood that the specific embodiments shown and described are illustrative of the invention and not restrictive, and that changes in construction and arrangement of parts may be made within the scope of the claims.

What I claim and desire to secure by U. S. Letters Patent is:

1. In a jet-powered convertible aircraft, a fuselage, an engine compartment surmounting the fuselage, fixed wings extending from opposite sides of the fuselage, ailerons pivoted to the wings, vertical stabilizer surfaces on the rear end of the fuselage, a rudder pivoted to said surfaces, horizontal stabilizer surfaces on the rear end of the fuselage, elevator flaps pivoted to the horizontal stabilizer surfaces, a vertical axis rotor disposed above the engine compartment, blades carried by the rotor, a turbojet-type engine in the engine compartment, an inlet to the engine, an exhaust tube from the engine, a rotary pressure jet control valve in the engine compartment in communication with said exhaust tube, a vertically disposed exhaust tube between the valve and said rotor, a horizontal exhaust tube extending rearwardly from said valve, and a further exhaust tube extending from the valve to a jet-steering control valve in the rear end of the fuselage, said rotary pressure jet control valve including rotary means for alternately closing the horizontal exhaust tube, and the vertical and last named exhaust tube, and operator control means in the forward part of said fuselage for operating said rotary means, whereby the aircraft is convertible from a helicopter to an airplane and vice versa.

2. The structure according to claim 1, together with a control means in the fuselage operatively connected to said rotor blades for turning same about their longitudinal axes for variation of the pitch thereof, and means interconnecting said control means with the ailerons and elevator flaps for simultaneous adjustment.

3. The structure according to claim 1, together with an operating member in the fuselage, and connections from such member for simultaneous adjustment of the jet steering control valve, and the rudder.

4. The structure according to claim 1, wherein said rotor is provided with a vertical tubular neck extending into said vertical exhaust tube, and means controllable from within said fuselage for locking said neck and therewith the rotor against rotation, in a predetermined position in relation to the fuselage.

5. The structure according to claim 4 wherein said means comprises a ring member surrounding said neck and having diametrically opposed slots therein and a toggle operable ball engageable within either one of said slots.

6. The structure according to claim 1, wherein said horizontal exhaust tube terminates in a discharge nozzle at the rear of said engine compartment, and an afterburner in said tube directly in advance of said nozzle.

7. The structure according to claim 1, wherein said blades are provided with tubes extending throughout the lengths thereof, afterburner grids at the tips of the blades and fuel line connections to the grids.

8. The structure according to claim 7, wherein said fuel line connections include a valve controlled fuel supply line having a swivel connection with the rotor.

9. The structure according to claim 1, together with a plurality of engines in said engine compartment, and separate exhaust connections from said engines to said rotary pressure jet control valve.

10. In a jet-powered convertible aircraft, a fuselage, an engine compartment adjacent to said fuselage, fixed wings extending from opposite sides of the fuselage, ailerons pivoted to the wings, vertical stabilizer surfaces on the rear end of the fuselage, a rudder pivoted to said surfaces, horizontal stabilizer surfaces on the rear end of the fuselage, elevator flaps pivoted to the horizontal stabilizer surfaces, a rotor comprising a plurality of hollow blades pivotally mounted for pitch adjustment in a rotor head and spherically mounted at the inner ends for flapping and dragging movement, a swashplate associated with the blades of said rotor, a tubular neck extending downwardly from said rotor head and rotatably mounted in said engine compartment, a turbo jet engine mounted in the engine compartment, an inlet to the engine, an exhaust tube from the engine, a jet control valve in the engine compartment in communication with said exhaust tube and said tubular neck, a horizontal exhaust tube extending rearwardly from said valve for producing a direct forward thrust and an additional exhaust tube extending from said valve to a jet-steering control valve having exhaust tubes extending laterally from the opposite sides thereof, a cyclic pitch control stick universally mounted in said fuselage, linkage interconnecting said swashplate, ailerons, elevator flaps and said control stick, a collective pitch stick operatively connected to said swashplate, foot-operated directional control means mounted in said fuselage, linkage interconnecting said rudder, jet-steering control valve and said foot-operated control means, and oscillating lever control means connected to said pressure jet control valve for directing the exhaust from said turbojet engine either vertically to said rotor and to said jet-steering control valve or horizontally to said horizontal exhaust tube or partly vertically and horizontally as desired by the operator.

11. In a jet-powered convertible aircraft, a fuselage, an engine compartment adjacent to said fuselage, fixed wings extending from opposite sides of the fuselage, ailerons pivoted to the wings, vertical stabilizer surfaces on the rear end of the fuselage, a rudder pivoted to said surfaces, horizontal stabilizer surfaces on the rear end of the fuselage, elevator flaps pivoted to the horizontal stabilizer surfaces, a rotor comprising a plurality of hollow blades pivotally mounted for pitch adjustment in a rotor head and spherically mounted at the inner ends for flapping and dragging movement, a swashplate associated with the blades of said rotor, a tubular neck extending downwardly from said rotor head and rotatably mounted in said engine compartment, multiple turbo jet engines mounted in the engine compartment, an inlet to each engine, an exhaust tube with valve from each engine, a pressure jet control valve in the engine compartment in communication with each of said exhaust tubes and said tubular neck, a horizontal exhaust tube extending rearwardly from said valve for producing a direct forward thrust, and an additional exhaust tube extending from said valve to a jet-steering control valve having exhaust tubes extending laterally from the opposite sides thereof, a cyclic pitch control stick universally mounted in said fuselage, linkage interconnecting said swashplate, ailerons, elevator flaps and said control stick, a collective pitch stick operatively connected to said swashplate, foot-operated directional control means mounted in said fuselage, linkage interconnecting said rudder, jet-steering control valve and said foot-operated control means, and oscillating lever control means connected to said pressure jet control valve for directing the exhaust from said turbojet engines either vertically to said rotor and to said jet-steering control valve or horizontally to said horizontal exhaust tube as desired by the operator.

12. The structure according to claim 10, together with a slotted ring member secured to said tubular neck, a bellcrank associated with said ring member and lever control means mounted in said fuselage for engaging said bellcrank with said ring member to lock said rotor in a predetermined position.

13. The structure according to claim 11, together with a slotted ring member secured to said tubular neck, a bellcrank associated with said ring member and lever control means mounted in said fuselage for engaging said bellcrank with said ring member to lock said rotor in a predetermined position.

14. The structure according to claim 10, together with afterburner grids mounted at the tips of the blades of said rotor, a valve controlled fuel supply to said grids for increasing the jet force at the tips of said blades and afterburner grids mounted in said horizontal exhaust tube for increasing said direct forward thrust.

15. The structure according to claim 11, together with afterburner grids mounted at the tips of the blades of said rotor, a valve controlled fuel supply to said grids for increasing the jet force at the tips of said blades and afterburner grids mounted in said horizontal exhaust tube for increasing said direct forward thrust.

16. In a jet-powered convertible aircraft, a fuselage, an engine compartment adjacent to said fuselage, fixed wings extending from opposite sides of the fuselage, ailerons pivoted to the wings, vertical stabilizer surfaces on the rear end of the fuselage, a rudder pivoted to said surfaces, horizontal stabilizer surfaces on the rear end of the fuselage, elevator flaps pivoted to the horizontal stabilizer surfaces, a rotor comprising two hollow blades pivotally mounted for pitch adjustment in a rotor head and spherically mounted at the inner ends for flapping and lagging movement, a swachplate associated with the blades of said rotor, a tubular neck extending downwardly from said rotor head and rotatably mounted in said engine compartment, a turbojet engine mounted in the engine compartment, an inlet to the engine, an exhaust tube from the engine, a rotary pressure jet control valve in the engine compartment in communication with said exhaust tube and said tubular neck, a horizontal exhaust tube extending rearwardly from said valve for producing a direct forward thrust and an additional exhaust tube extending from said valve to a jet-steering control valve having exhaust tubes extending laterally from the opposite sides thereof, a cyclic pitch control mechanism universally mounted in said fuselage and interconnected to said swashplate, ailerons and elevator flaps, a collective pitch mechanism operatively connected to said swashplate, foot-operated directional control mechanism interconnected to said rudder and said jet-steering control valve, and oscillating lever control means connected to said pressure jet control valve for directing the exhaust from said turbojet engine either vertically to said rotor and to said jet-steering control valve or horizontally to said horizontal exhaust tube, whereby the aircraft may be converted from helicopter to airplane operation and vice versa.

17. In a jet-powered convertible aircraft, a fuselage, an engine compartment adjacent to said fuselage, fixed wings extending from opposite sides of the fuselage, ailerons pivoted to the wings, vertical stabilizer surfaces on the rear end of the fuselage, a rudder pivoted to said surfaces, horizontal stabilizer surfaces on the rear end of the fuselage, elevator flaps pivoted to the horizontal surfaces, a rotor comprising two hollow blades pivotally mounted for pitch adjustment in a rotor head and spherically mounted at the inner ends for flapping and lagging movement, a swachplate associated with the blades of said rotor, a tubular neck extending downwardly from said rotor head and rotatably mounted in said engine compartment, multiple turbojet engines mounted in the engine compartment, an inlet to each engine, an exhaust tube with valve from each engine, a rotary pressure jet control valve in the engine compartment in communication with each of said exhaust tubes and said tubular neck, a horizontal exhaust tube extending rearwardly from said valve for producing a direct forward thrust and an additional exhaust tube extending from said valve to a jet-steering control valve having exhaust tubes extending laterally from the opposite sides thereof, a cyclic pitch control mechanism universally mounted in said fuselage and interconnected to said swashplate, ailerons and elevator flaps, a collective pitch mechanism operatively connected to said swashplate, foot-operated directional control mechanism interconnected to said rudder and said jet-steering control valve and oscillating control means connected to said pressure jet control valve for directing the exhaust from said turbojet engines either vertically to said rotor and to said jet-steering control valve or horizontally to said horizontal exhaust tube, whereby the aircraft may be converted from helicopter to airplane operation and vice versa.

18. The structure according to claim 16, together with a slotted ring member secured to said tubular neck, a bellcrank associated with said ring member and lever control means mounted in said fuselage for engaging said bellcrank with said ring member to lock said rotor with the blades in a fore and aft position to reduce the drag of the rotor.

19. The structure according to claim 17, together with a slotted ring member secured to said tubular neck, a bellcrank associated with said ring member and lever control means mounted in said fuselage for engaging said bellcrank with said ring member to lock said rotor with the blades in a fore and aft position to reduce the drag of the rotor.

20. The structure according to claim 19, together with afterburner grids mounted at the tips of the blades of said rotor, a valve controlled fuel supply to said grids for increasing the jet force at the tips of said blades and afterburner grids mounted in said horizontal exhaust tube for increasing said direct forward thrust.

References Cited in the file of this patent

UNITED STATES PATENTS

| Number | Name | Date |
|---|---|---|
| 2,396,130 | Sbrilli | Mar. 5, 1946 |
| 2,544,497 | Herrick | Mar. 6, 1951 |

FOREIGN PATENTS

| Number | Country | Date |
|---|---|---|
| 931,296 | France | Oct. 6, 1947 |